March 12, 1935.  C. EDWARDS ET AL  1,994,415
JAR HOLDER AND JAR CAP WRENCH
Filed May 11, 1933
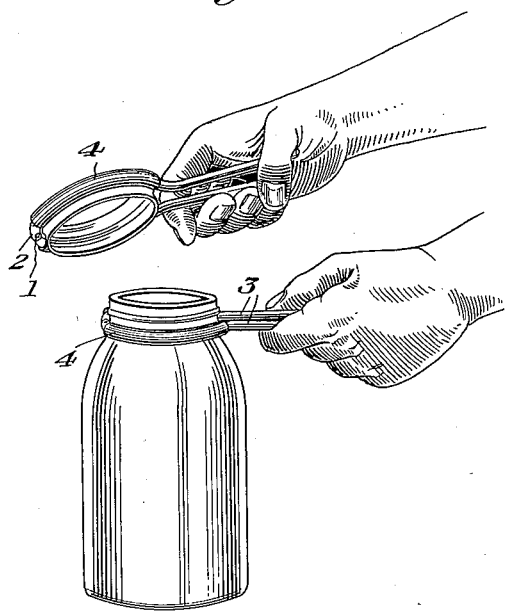
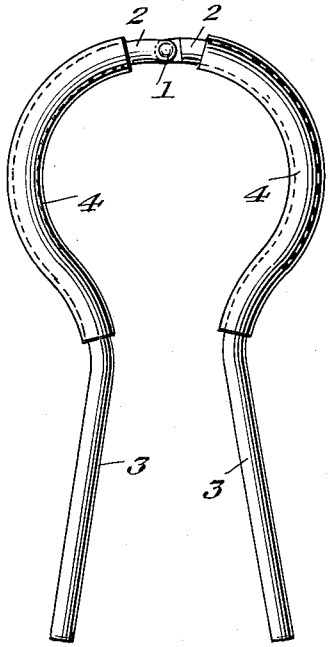
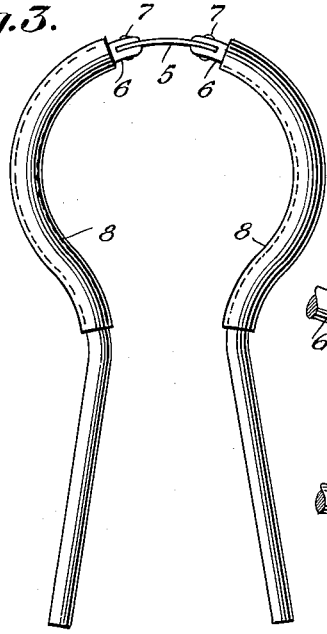
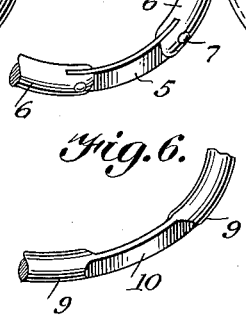
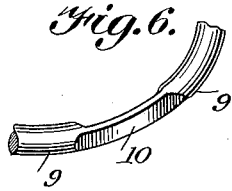
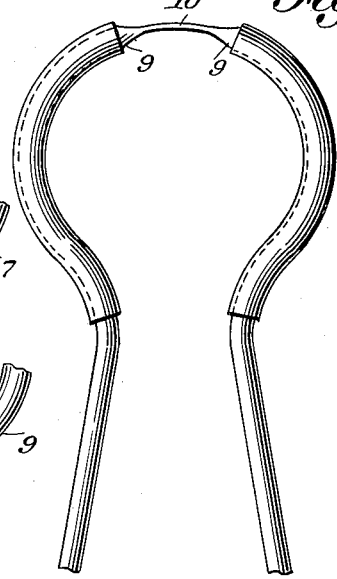
INVENTORS
Charles Edwards,
BY Peter F. Murray,
ATTORNEY Patented Mar. 12, 1935

1,994,415

UNITED STATES PATENT OFFICE 1,994,415

JAR HOLDER AND JAR CAP WRENCH

Charles Edwards, Lehighton, and Peter F. Murray, Beaver Meadows, Pa.

Application May 11, 1933, Serial No. 670,542

1 Claim. (Cl. 81—3.1)

Our present invention has reference to a jar holder and jar cap wrench primarily designed for use by a housewife, or others, when canning fruits or vegetables so that the hot preserves may be easily poured into the jar without spilling and the cap screwed on the jar while held at a safe distance from the operator and thereby insure the latter from the liability of burning or scalding and also materially expedite the canning operation.

A further object is the provision of tools for this purpose, each of which is formed from a metal rod which is centrally rounded upon itself to provide a jaw portion and which jaw portion has extended ends that afford handles, the jaw portion, at the center thereof, being divided or depressed to provide two jaws which are yieldably connected, to thereby produce an extremely simple and cheaply constructed tool which is strong and durable and thoroughly efficient for its purpose.

Another object is to cover each jaw with an elastic tube which will, when under compression, yield both laterally and longitudinally to thus insure a better grip upon the object engaged without any liability of breakage or other damage to such object.

To the attainment of the above we aim to produce an effective tool for this purpose that shall be characterized by simplicity in construction, ease in manufacture, and which may be very cheaply commercialized.

In the accompanying drawing,

Fig. 1 is a perspective view showing the manner in which the jar and cap are gripped, prior to the screwing of the cap on the jar.

Fig. 2 is a plan view of one form of the improvement.

Fig. 3 is a plan view of another form.

Fig. 4 is a detail perspective view illustrating the elastic connection between the jaws of the tool shown by Fig. 3.

Fig. 5 is a plan view of another form of tool.

Fig. 6 is a detail perspective view thereof to better illustrate the elastic connection between the jaws.

In canning vegetables, fruits or berries, for home use, the housewife places the containers, usually the well known "Mason" jars, in a pan of water as near as possible to the kettle in which the fruit is boiled. The water in the pan is brought to almost a boiling point so the jars thus become very hot and cannot be handled without scorching the hands of the canner. The caps for the jars are also frequently placed in the pan. To remove the jars and caps and to steadily hold the jars so that the scalding fruit may be poured into the hot jars and the caps thereafter firmly screwed on the jars has proved difficult and dangerous to the housewife as scalds and broken jars frequently result.

With our improvement this is entirely overcome and our tool renders the canning operation easy, expedient and pleasant. Instead of gripping by her hands the heated jars or resorting to the employment of a cold towel (which frequently results in the breakage of the jar when the scalding fruit is poured thereon), the housewife has merely to place into the heated water one of our tools and bring the same to grip the neck (below the threads), of the jar and with another tool grip the cap. The housewife may now bring the jar over the scalding fruit and use the other tool to grip a ladle for dipping and conveying the fruit to the jar. It is to be noted that the housewife stands away from the preserving kettle so that her hands are at a distance from the heated fumes and, consequently, she can receive no injuries therefrom nor from a broken jar. When the jar is filled it is still held gripped by the operator and another similar tool is held by the second hand of the operator and brought to grip the cap to screw the cap home on the threaded neck of the jar. By this means, it will be noted, the canning operation is rendered easy, quick, and without any liability of danger to the operator, the jar or the cap. The tools, of course, are designed to remove the cap from the jar when the preserves are to be used.

We may here state that we are aware that tools for a similar purpose have been patented and are well known to us and in the following description we shall endeavor to point out with distinction the difference and advantages of our device over those known in the art.

Referring now to the drawing in detail, it will be noted that we have constructed our tool of a single bar of metal, round or tubular, in cross section. A long bar is cut, by a suitable machine, into equal lengths. Each of these bar lengths is, by another machine, centrally rounded upon itself to produce an approximately circular jaw portion whose ends are extended at opposite outward angles to produce handles.

In Figs. 1 and 2, the jaw portion of the tool is centrally cut away and the opposite jaws thus provided are hammered to afford flattened ends, designed for lapping engagement and also designed to receive therethrough a rivet 1 that connects the opposed arcuate jaws 2—2. The rivet 1 compresses the lapping ends of the jaws but renders the same easily swung toward or away from each other when the handles 3 are moved by the operator. Over the jaws 2 we arrange elastic tubes 4, which are preferably fluted or corrugated in the usual manner. It is to be noted that the tubes 4 have one of their ends disposed away from the rivet 1 and that their second ends are arranged slightly over the handles at their juncture with the jaws. This is important as the elastic tubes are thus held from longitudinal movement on the jaws. Each tube affords a compressible gripping facing for each jaw and can be rounded upon the jar should its operative surface become impaired. These elastic shoes or facings exert each a distinct pressure upon the jar, cap or dipper engaged thereby and incident to their arrangement on the jaws their lateral as well as their longitudinal compression is limited so that they not only firmly grasp an article without injury but separately perform their function without liability of not returning to their proper position on the jaw when released from engagement.

In Figs. 3 and 4 the construction is similar with the exception that the cut-away part of the jaw member has its confronting ends slotted laterally and in these slots we insert the ends of a flat arched spring 5. The ends of the spring are secured to the jaw members 6 by rivets 7. The heads of the rivets prevent the compressible tubes 8 from travelling toward the outer center of the jaws. The spring 5 affords a yieldable connection for the jaws, holds the same properly spaced and allows a greater pressure being applied to one jaw than to the other, a most desirable feature which will be apparent to those who engage in canning. In addition to this, the jaws may be turned on the rivets 7 to bring the same to slightly different planes should such be found desirable or convenient in gripping the jar or cap.

In Figs. 5 and 6, we have further simplified the device by subjecting the jaw member, at the center thereof, to pressure from opposite directions to thus flatten the same and divide the jaws 9—9 from each other by a thin spring web 10. This form of tool has all of the advantages of the other described tools together with simplicity and cheapness in construction. The spring 10 holds the jaws initially properly spaced, renders the jaws yieldable under pressure and permits the jaws moving slightly out of registering alinement should occasion require. It is to be noted that the spring connection for the jaws is arranged at the center of the confronting ends of said jaws and therefore cannot contact with the object engaged by the jaws. This permits of a separate or individual bite of each jaw when the jaws are disposed directly opposite or at a slight angle with respect to each other. Also it is to be noted that the biting surface of each jaw is equal to the entire circumferential area of said jaw. In Figs. 3 and 4 the rivets 7 not only prevent the movement of the compressible tubes 8 onto the connecting spring 5 for the jaws but the said rivets permit the relative swinging of the respective jaws to bring the said jaws in proper opposite gripping engagement with the article engaged thereby but at different planes.

It is thought that the foregoing description, when read in connection with the drawings, will adequately acquaint those skilled in the art to which my invention relates with a full and comprehensive understanding of the same and the manifold advantages thereof, so that further detailed description is not believed necessary.

Having described our invention, we claim:

The herein described construction of a jar holder and jar cap wrench; comprising a body which is round in plan but less than a circle and which has extended ends to afford handles, said body having its central portion, from a point in alinement with its spaced handles cut away to afford opposed jaws, and the said jaws being slitted from their confronting ends at points right angular to the biting surfaces of said jaws, an arched spring plate whose curvature corresponds to that of the jaws having its ends let into the slits and riveted to the respective jaws and affording a spring and hinged connection between said jaws, and which connection permits a limited lateral movement of one jaw with respect to the other jaw, and said jaws having arranged thereon a compressible facing.

CHARLES EDWARDS.
PETER F. MURRAY.